United States Patent
Thapliya

(10) Patent No.: US 9,847,923 B2
(45) Date of Patent: Dec. 19, 2017

(54) COMMUNICATION STATUS MEASUREMENT DEVICE, COMMUNICATION STATUS MEASUREMENT METHOD AND NON-TRANSITORY COMPUTER READABLE MEDIUM

(71) Applicant: FUJI XEROX CO., LTD., Tokyo (JP)

(72) Inventor: Roshan Thapliya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 97 days.

(21) Appl. No.: 14/712,455

(22) Filed: May 14, 2015

(65) Prior Publication Data

US 2015/0263924 A1    Sep. 17, 2015

Related U.S. Application Data

(63) Continuation of application No. PCT/JP2013/071048, filed on Aug. 2, 2013.

(30) Foreign Application Priority Data

Jan. 31, 2013    (JP) .................................. 2013-016993

(51) Int. Cl.
   *H04L 12/26*    (2006.01)
   *H04L 12/841*   (2013.01)
   (Continued)

(52) U.S. Cl.
   CPC ...... *H04L 43/0864* (2013.01); *H04L 12/4641* (2013.01); *H04L 43/0888* (2013.01);
   (Continued)

(58) Field of Classification Search
   CPC . H04L 12/4641; H04L 43/0864; H04L 45/26; H04W 24/08
   See application file for complete search history.

(56) References Cited

U.S. PATENT DOCUMENTS 6,757,255 B1    6/2004    Aoki et al.
9,413,766 B2 *  8/2016    Larson .............. H04L 29/12216
(Continued)

FOREIGN PATENT DOCUMENTS

JP    2000-106557 A    4/2000
JP    2006-523004 A    10/2006
JP    2007-534194 A    11/2007

OTHER PUBLICATIONS

Miyabayashi, et al. "MPEG-4 Video Transfer with TCP-friendly Rate Control Protocol", Technical Report of IEICE, Mar. 2, 2001, vol. 100, Issue No. 672, 30 pages total.
(Continued)

*Primary Examiner* — Rhonda Murphy
(74) *Attorney, Agent, or Firm* — Sughrue Mion, PLLC

(57) ABSTRACT

There is provided a communication status measurement device wirelessly connected to a public network and communicating with a server connected to the public network through a communication channel determined in advance. A measurement unit repeatedly measures a time since a dummy packet is transmitted to the server until an acknowledgement packet corresponding to the dummy packet is received. A pattern calculation unit calculates a pattern obtained by removing a component at frequencies more than a first frequency from a pattern of variations in a measured value. An RTT acquisition unit that acquires a round trip time, which is used to calculate an actual bandwidth of the communication channel, on a basis of the calculated pattern. An implementation unit implements a virtual private network in the communication status measurement device itself. The dummy packet is transmitted and the acknowledgement packet is received via the virtual private network and the public network.

7 Claims, 7 Drawing Sheets

(51) Int. Cl.
H04L 12/46 (2006.01)
H04L 12/721 (2013.01)
H04W 24/08 (2009.01)

(52) U.S. Cl.
CPC ............ H04L 45/26 (2013.01); H04L 47/283 (2013.01); H04W 24/08 (2013.01)

(56) References Cited

U.S. PATENT DOCUMENTS

| | | |
|---|---|---|
| 2003/0023746 A1* | 1/2003 | Loguinov ............... H04L 47/10 709/235 |
| 2004/0187384 A1 | 9/2004 | Dardas et al. |
| 2005/0036511 A1 | 2/2005 | Baratakke et al. |
| 2008/0186863 A1 | 8/2008 | Baratakke et al. |

OTHER PUBLICATIONS

Sueyasu, T., "Monthly Report [Android Watch]: Security-Enhanced Android 4.2 Capable of Blocking Introduction of Hazardous Application, etc.", Nikkei Communications; Issue No. 587, Dec. 1, 2012, 13 pages total.
Communication dated Apr. 12, 2016, issued by the Japanese Patent Office in counterpart Japanese Patent Application No. 2013-016993.
International Search Report dated Nov. 5, 2013 issued in counterpart International Application No. PCT/JP2013/071048 (PCT/ISA/210).
Written Opinion dated Nov. 5, 2013 issued in counterpart International Application No. PCT/JP2013/071048 (PCT/ISA/237).

* cited by examiner

COMMUNICATION STATUS MEASUREMENT DEVICE, COMMUNICATION STATUS MEASUREMENT METHOD AND NON-TRANSITORY COMPUTER READABLE MEDIUM

CROSS-REFERENCE TO RELATED APPLICATIONS

This is a continuation of International Application No. PCT/JP2013/071048 filed on Aug. 2, 2013, and claims priority from Japanese Patent Application No. 2013-016993, filed on Jan. 31, 2013.

TECHNICAL FIELD

The present invention relates to a communication status measurement device, a communication status measurement method and a non-transitory computer readable medium.

SUMMARY

According to an aspect of the exemplary embodiments of the present invention, there is provided a communication status measurement device that is wirelessly connected to a public network and that communicates with a server connected to the public network through a communication channel determined in advance, including: a measurement unit that repeatedly measures a time since a dummy packet is transmitted to the server until an acknowledgement packet corresponding to the dummy packet is received; a pattern calculation unit that calculates a pattern obtained by removing a component at frequencies more than a first frequency from a pattern of variations in a measured value measured by the measurement unit; an RTT acquisition unit that acquires a round trip time, which is used to calculate an actual bandwidth of the communication channel, on a basis of the pattern calculated by the pattern calculation unit; and an implementation unit that implements a virtual private network in the communication status measurement device itself, wherein the dummy packet is transmitted and the acknowledgement packet is received via the virtual private network and the public network.

BRIEF DESCRIPTION OF DRAWINGS

Exemplary embodiments of the present invention will be described in detail based on the following figures, wherein.

DETAILED DESCRIPTION

Figure 1:
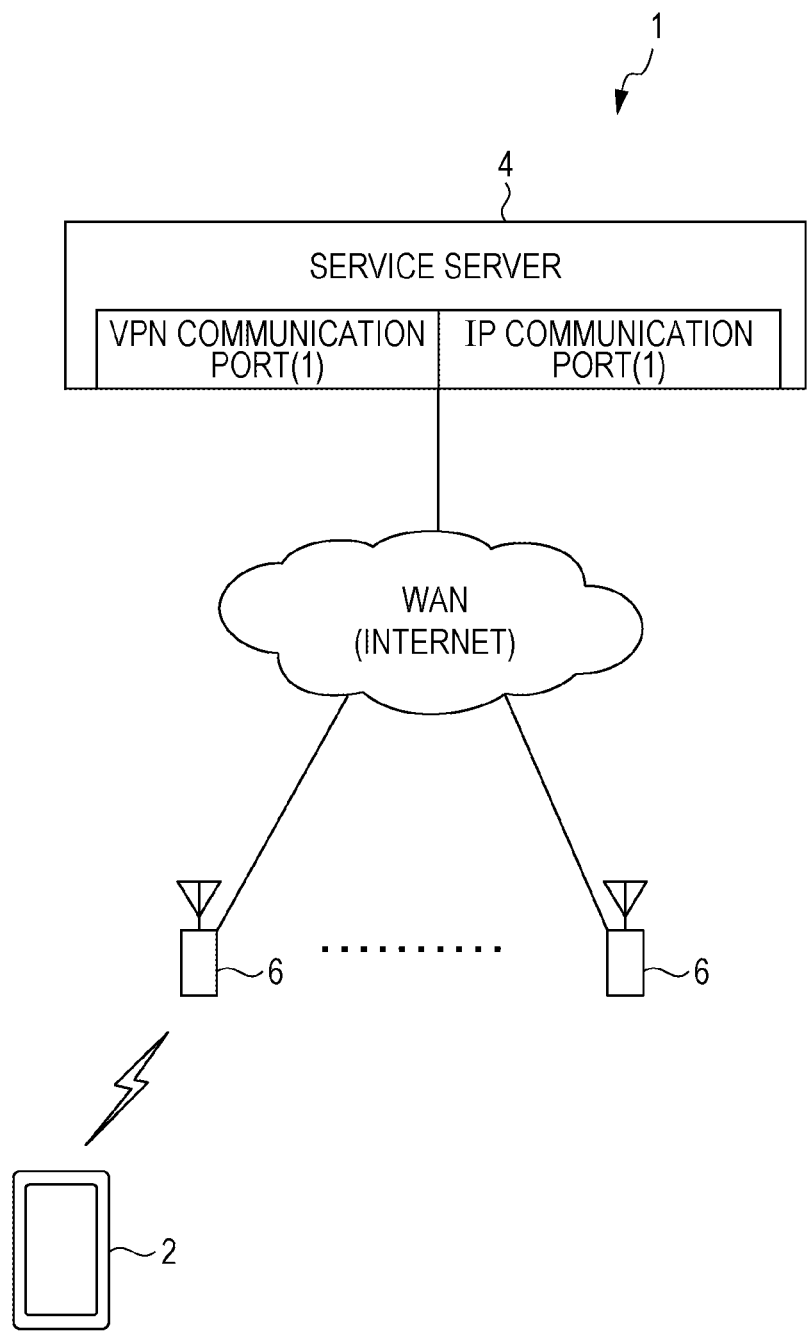
FIG. 1 illustrates an example of the configuration of a service system.

FIG. 1 illustrates an example of the configuration of a service system. The service system includes a service server 4, plural base station antennas 6, and a portable terminal 2. The service server 4 is a server owned by a Mobile Virtual Network Operator (hereinafter referred to as "MVNO") that borrows a certain communication channel X from a network operator, and is connected to a WAN (Wide Area Network) which is a public network. The WAN is also called "Internet". The service server 4 provides various information processing services to the portable terminal 2 of a subscriber to the MVNO via the communication channel X. Here, the service server 4 provides a video streaming distribution service to the portable terminal 2 of the subscriber. The service server 4 is provided with an IP communication port (1) corresponding to a network interface and implemented in a software manner through an operating system. An IP address of the service server 4 is assigned to the IP communication port (1). The information processing service is provided via the IP communication port (1). In the case of the exemplary embodiment, in addition, VPN (Virtual Private Network) server software is installed in the service server 4, and the service server 4 is provided with a VPN communication port (1) implemented in a software manner through the VPN server software. An IP address in a virtual private network (hereinafter referred to as "VPN") is assigned to the VPN communication port (1).

The significance of the VPN communication port (1) will be discussed later.

The base station antennas 6 are antennas that wirelessly connect the portable terminal 2 to the WAN.

The portable terminal 2 is a computer used for the subscriber to the MVNO to utilize the information processing service, and includes a microprocessor, a main memory, a display, a speaker, a wireless communication interface, and so forth. Here, the portable terminal 2 is a cellular phone which is a so-called Android (registered trademark) terminal. The main memory stores a communication measurement program distributed over a network by the MVNO. The microprocessor executes a process to be described later in accordance with the communication measurement program. The communication measurement application may be read from a computer-readable information storage medium such as a DVD (registered trademark)-ROM to be stored in the main memory.

The portable terminal 2 is wirelessly connected to any of the base station antennas 6 (e.g. a nearby base station antenna 6) through the wireless communication interface. In addition, the portable terminal 2 is wirelessly connected to the WAN through the wireless connection to the base station antenna 6. In this way, the portable terminal 2 and the service server 4 are connected to the WAN, and communication between the two devices is performed through the communication channel X. The base station antenna 6 to which the portable terminal 2 is connected is switched in accordance with movement of the portable terminal 2. In FIG. 1, only one portable terminal 2 is illustrated. However, there are plural subscribers to the MVNO, and there are plural portable terminals 2 that utilize the information processing service via the communication channel X.

The service server 4 manages the communication data capacity of the communication channel X in order to guarantee the quality experienced by a user, or so-called QoE (Quality of Experience), when providing the information processing service to the portable terminal 2. That is, the service server 4 stores a set value BWx of the bandwidth (amount of communication data per unit time) of the communication channel X, and performs congestion control on the basis of the set value BWx.

Specifically, the service server 4 includes a cue buffer for the communication channel X that holds data in a first-in first-out method. A group of packets of video data to be transmitted via the communication channel X is enqueued in the cue buffer so that the enqueued packets are transmitted to the communication channel X in the first-in first-out order. The service server 4 performs traffic shaping (so-called packet shifting) on the basis of the set value BWx to perform congestion control such that the amount of data to be sent to the communication channel X per unit time does not exceed the set value BWx.

Figure 2:
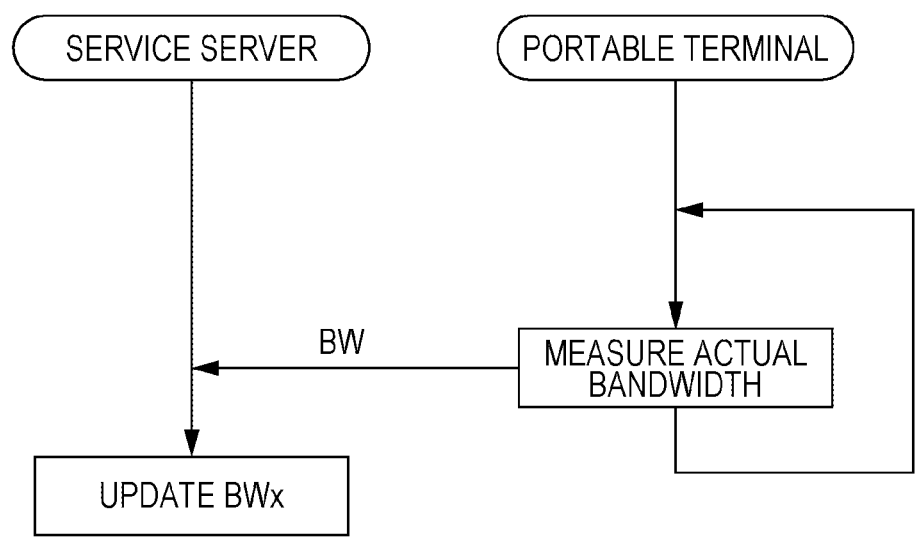
FIG. 2 briefly illustrates control performed by a service server.

The service server 4 performs control other than the control described above. FIG. 2 briefly illustrates control performed by the service server 4. That is, in the portable terminal 2, the actual bandwidth of the communication channel X (the amount of communication data per unit time that actually flows through the communication channel X) is repeatedly measured by the communication measurement program described above, and the measured actual bandwidth BW is sequentially delivered to the service server 4. The service server 4 also updates the set value BWx on the basis of the actual bandwidth BW each time the actual bandwidth BW is delivered. For example, the service server 4 reduces the set value BWx to such an extent that the set value BWx does not fall below the actual bandwidth BW in the case where there is an allowance in the set value BWx, that is, in the case where the set value BWx is larger than the actual bandwidth BW by a certain amount or more.

The actual bandwidth is also called "throughput".

The actual bandwidth BW is represented by the following throughput equation which is represented as a function of a round trip time RTT:

$$BW = C \cdot \frac{MSS}{RTT} \cdot \frac{1}{p^k}$$ [Math. 1]

Here, "C" and "k" are each a predetermined constant. In addition, the maximum segment size "MSS" is the data size of data to be transmitted in one data transmission, and 1500 bytes in the exemplary embodiment. In addition, "p" indicates the packet loss rate.

Since the actual bandwidth BW is represented as a function of the round trip time RTT, the actual bandwidth BW is calculated by measuring the round trip time RTT. A measurement method (1) in which a command (e.g. a Ping) implemented in an ICMP protocol is issued is conceivable as a measurement method for the round trip time RTT. Since the base station antenna 6 to which the portable terminal 2 is connected is switched in accordance with movement of the portable terminal 2, however, the connection is unstable. Therefore, in consideration of a fact that TCP and UDP are normally treated in priority to ICMP in a network router, an accurate round trip time RTT may not be obtained by the measurement method (1).

Thus, a measurement method (2) in which a dummy packet is transmitted to the service server 4 in accordance with a TCP protocol and a measured value T of the time since transmission of the dummy packet until reception of an acknowledgement packet is obtained as the round trip time RTT is also conceivable. However, an accurate round trip time RTT may not be obtained also by the measurement method (2) because of the effect of noise due to the wireless connection. That is, with the measurement method (2), the measured value T contains a noise component Tnoise. More particularly, the measured value T is conceptually represented by the following formula:

$$T \approx RTT + Tnoise$$

Moreover, the measurement method (2) requires a root authority for an Android operation system.

In this respect, the portable terminal 2 is designed to obtain an accurate round trip time RTT using the measurement method (2) without requiring a root authority. This point will be described below.

Figure 3A:
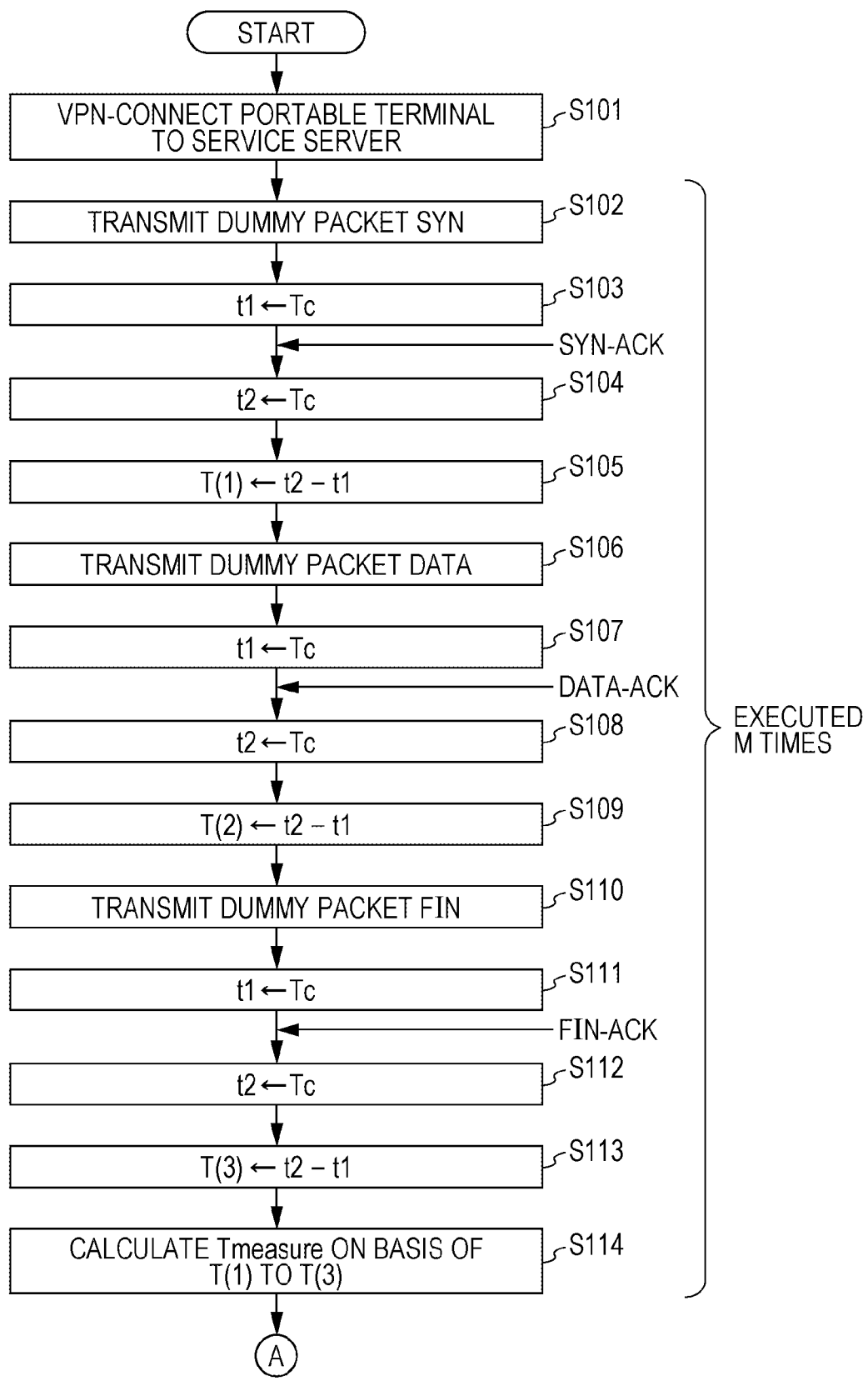
FIG. 3A is a flowchart illustrating a process executed by a portable terminal.
Figure 3B:
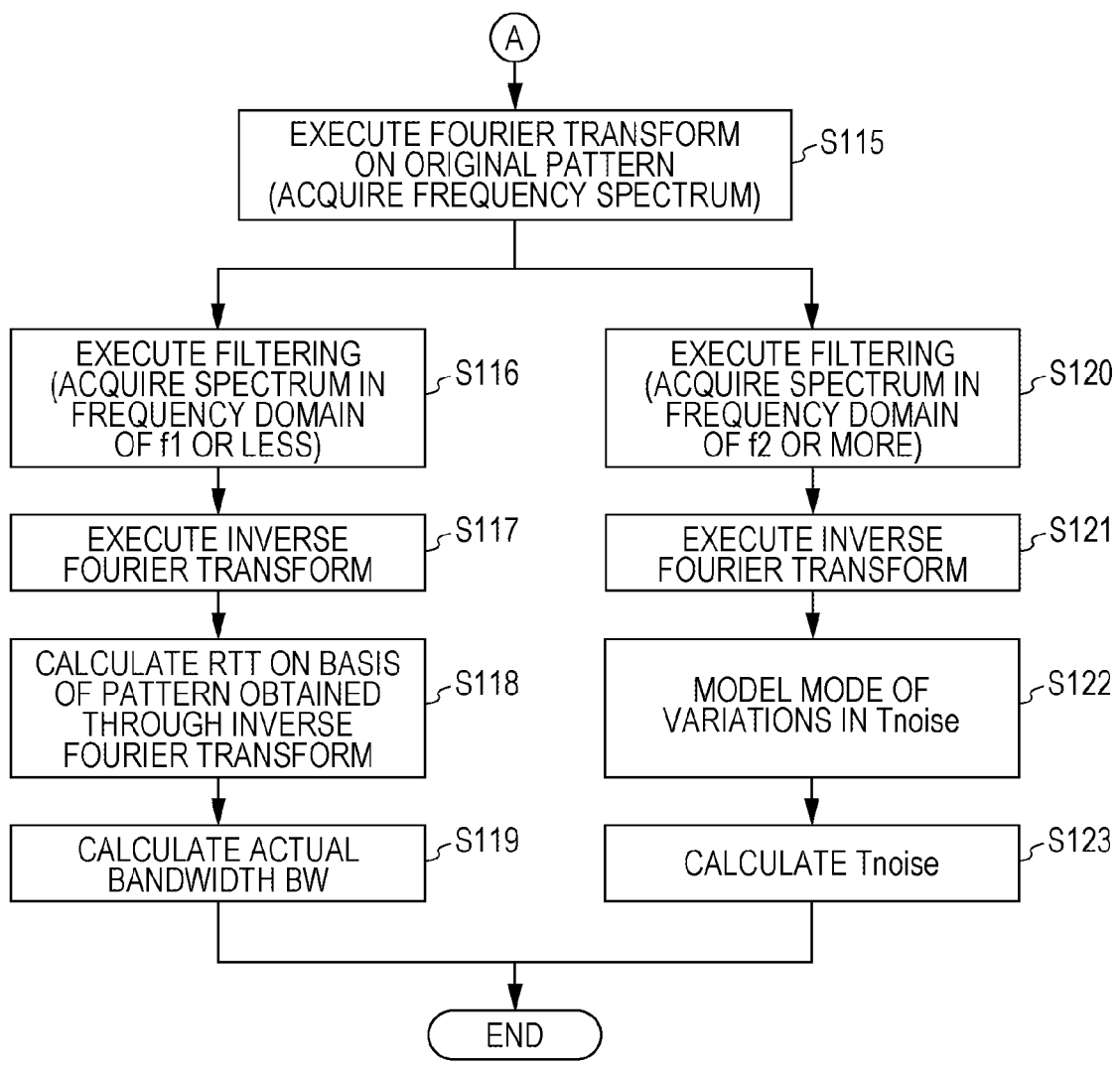
FIG. 3B is a flowchart illustrating a process executed by the portable terminal.

FIGS. 3A and 3B are each a flowchart illustrating a process executed by the microprocessor in accordance with the communication measurement program described above in the portable terminal 2. The microprocessor executes the process illustrated in the flowcharts in predetermined cycles.

First, the microprocessor (VPN connection means) connects the portable terminal 2 to the service server 4 through a VPN (Virtual Private Network) utilizing a VPN communication function implemented in the Android operating system as a standard function (S101). That is, the microprocessor VPN-connects the portable terminal 2 to the service server 4. More particularly, the microprocessor implements a VPN communication port (2) in the portable terminal 2 in a software manner, the VPN communication port (2) communicating via the VPN with a VPN communication port (1) implemented in the service server 4 utilizing the VPN communication function. An IP address in the VPN is assigned to the VPN communication port (2). An IP communication port (2) is an IP communication port corresponding to the wireless communication interface, and is implemented in a software manner by the Android operating system. An IP address of the portable terminal 2 is assigned to the IP communication port (2). The IP communication port (2) is used for communication with the IP communication port (1).

Then, the microprocessor (measurement means) executes a series of steps S102 to S114 "M (M is a positive integer)" times at intervals of one minute, for example. In this way, the microprocessor repeatedly measures an actual measured value Tmeasure to be discussed later "M" times.

That is, the microprocessor transmits a dummy packet SYN from the VPN communication port (2) to the VPN communication port (1) (S102), and sets the value of a parameter t1 to a current time Tc (S103). Then, when the VPN communication port (2) receives an acknowledgement packet SYN-ACK transmitted from the VPN communication port (1), the microprocessor sets the value of a parameter t2 to the current time Tc (S104), and calculates a time T(1) since the time indicated by the parameter t1 until the time indicated by the parameter t2 (S105).

When the time T(1) is calculated, the microprocessor transmits a dummy packet DATA from the VPN communication port (2) to the VPN communication port (1) from this time on (S106), and sets the value of the parameter t1 to the current time Tc (S107). Then, when the VPN communication port (2) receives an acknowledgement packet DATA-ACK transmitted from the VPN communication port (1), the microprocessor sets the value of a parameter t2 to the current time Tc (S108), and calculates a time T(2) since the time indicated by the parameter t1 until the time indicated by the parameter t2 (S109).

When the time T(2) is calculated, the microprocessor transmits a dummy packet FIN from the VPN communication port (2) to the VPN communication port (1) from this time on (S110), and sets the value of the parameter t1 to the current time Tc (S111). Then, when the VPN communication port (2) receives an acknowledgement packet FIN-ACK transmitted from the VPN communication port (1), the microprocessor sets the value of the parameter t2 to the current time Tc (S112), and calculates a time T(3) since the time indicated by the parameter t1 until the time indicated by the parameter t2 (S113).

Figure 5:
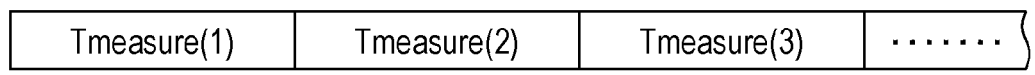
FIG. 5 illustrates an example of an actual measured value string.

Then, the microprocessor (measurement means) measures the actual measured value Tmeasure discussed above on the basis of the time T(1) to the time T(3) (S114). The actual measured value Tmeasure corresponds to the "measured value". For example, in S114, the microprocessor calculates an average value of the time T(1) to the time T(3) as the actual measured value Tmeasure. In S114, the microprocessor also saves the actual measured value Tmeasure in the main memory as the last element of a data string of the actual measured value Tmeasure (hereinafter referred to as "actual measured value string"). For example, in the case where "L (L is 0 or a positive integer)" actual measured values Tmeasure are included in the actual measured value string, the actual measured value Tmeasure is saved in the main memory as the "L+1"-th element of the actual measured value string in S114. FIG. 5 illustrates an example of the actual measured value string.

Figure 6:
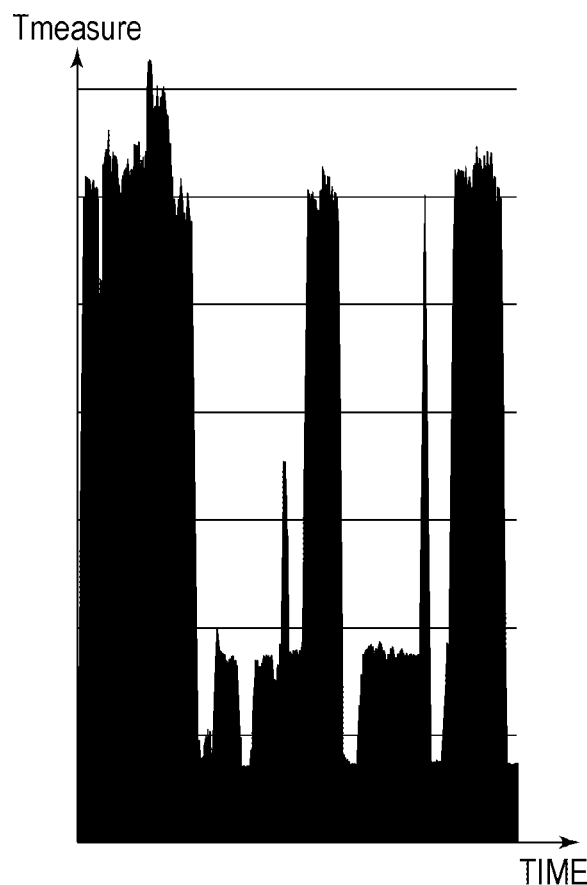
FIG. 6 illustrates a pattern of variations in actual measured value Tmeasure.

As discussed above, the actual measured value Tmeasure is measured "M" times. Therefore, the actual measured value string finally includes "M" actual measured values Tmeasure. The actual measured value string indicates a pattern of variations in actual measured value Tmeasure. FIG. 6 illustrates an example of the pattern of variations in actual measured value Tmeasure. The horizontal axis indicates the time, and the vertical axis indicates the actual measured value Tmeasure. Small variations correspond to noise.

Here, three dummy packets are transmitted in order to obtain one actual measured value Tmeasure. However, the number "N" of dummy packets is not limited to "3", and may be set as appropriate.

It is considered that the dummy packets may be transmitted and the acknowledgement packets may be received without utilizing the VPN communication function. That is, it is considered that dummy packets may be transmitted from the IP communication port (2) to the IP communication port (1) and the acknowledgement packets transmitted from the IP communication port (1) may be received by the IP communication port (2). In this case, however, a root authority is required. In this respect, the portable terminal 2 utilizes the VPN function, and does not require a root authority.

After executing the series of steps S102 to S114 "M" times, the microprocessor executes step S115 and the subsequent steps. That is, the microprocessor reads the actual measured value string from the main memory, executes a Fourier transform on the pattern (hereinafter referred to as "original pattern") of variations in actual measured value Tmeasure represented by the actual measured value string (S115), and saves a frequency spectrum obtained as a result of the Fourier transform in the main memory.

Figure 7:
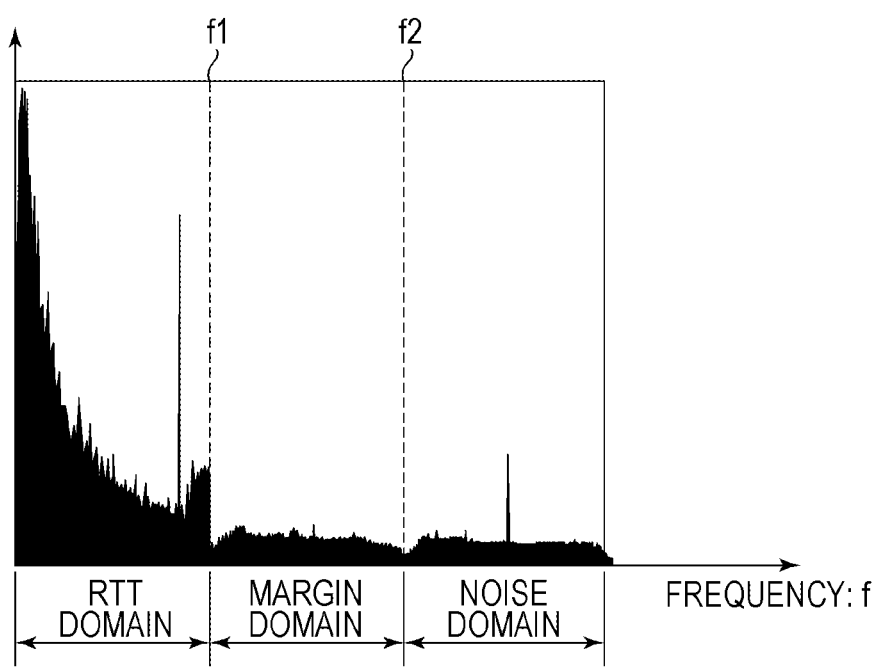
FIG. 7 illustrates a frequency spectrum.

FIG. 7 illustrates the frequency spectrum obtained as a result of the Fourier transform. The horizontal axis represents a frequency f. In FIG. 7, a frequency domain at a frequency f2 (second frequency) or more is indicated as "noise domain", a domain at a frequency f1 (first frequency) or less is indicated as "RTT domain", and a frequency domain between the frequency f1 and the frequency f2 is indicated as "margin domain". It is considered that a component included in the original pattern and having a frequency in the RTT domain indicates the round trip time RTT. In addition, it is considered that a component having a frequency in the noise domain indicates the Tnoize discussed above. It is considered that a component having a frequency in the margin domain indicates a component related to a congestion (so-called congestion) state of the communication channel X.

The frequency f1 is set as appropriate in accordance with the congestion state of the communication channel X. Therefore, depending on the congestion state, the frequency f1 and the frequency f2 may be set to the same value so that there is no margin domain.

Subsequently, the microprocessor concurrently executes a process for a first system composed of S116 to S119 and a process for a second system composed of S120 to S123. First, the process for the first system will be described. In the process for the first system, in order to obtain the RTT, the microprocessor reads the frequency spectrum obtained in S115 from the main memory, and executes filtering to extract a frequency spectrum in the RTT domain from the read frequency spectrum (S116). That is, the microprocessor extracts a frequency spectrum in a frequency domain at the frequency f1 or less from the read frequency spectrum.

Then, the microprocessor (pattern calculation means) executes an inverse Fourier transform on the frequency spectrum obtained in S116 (S117), and calculates a pattern obtained by removing a component at frequencies more than the frequency f1 from the original pattern. In addition, the microprocessor (RTT acquisition means) calculates the round trip time RTT on the basis of the pattern obtained as a result of S117 (S118). Here, the microprocessor calculates the time average of the pattern obtained as a result of S117 as the round trip time RTT. In this way, the microprocessor measures the round trip time RTT accurately.

Then, the microprocessor substitutes the round trip time RTT and a packet loss rate p, which has been measured by a technique known in the art, into the throughput equation discussed above to calculate an actual bandwidth BW, and transmits the calculated actual bandwidth BW to the service server 4 for congestion control performed by the service server 4 (S119).

Next, the process for the second system will be described. In the process for the second system, the microprocessor reads the frequency spectrum obtained in S115 from the main memory, and executes filtering to extract a frequency spectrum in the noise domain from the read frequency spectrum (S120). That is, the microprocessor extracts a frequency spectrum in a frequency domain at the frequency f2 or more from the read frequency spectrum.

In addition, the microprocessor (calculation means) executes an inverse Fourier transform on the frequency spectrum obtained in S120 (S121), and calculates a pattern obtained by removing a component at frequencies less than the frequency f2 from the original pattern. Then, the microprocessor (modeling means) performs a predetermined computation on the pattern obtained in S121 using a Kalman filter to model the mode of variations in Tnoise (S122). In addition, an estimated value of Tnoise is calculated on the basis of the result of the modeling, and the calculated estimated value of Tnoise is transmitted to the service server 4 (S123). In the service server 4, the estimated value of Tnoise is used to control the quality experienced by the user, or so-called QoE (Quality of Experience).

In the foregoing description, the process for the first system and the process for the second system are executed concurrently. However, the two processes may be executed sequentially.

Exemplary embodiments of the present invention are not limited to the exemplary embodiment described above.

For example, the base station antennas 6 may each be a wireless access point.

Figure 4:
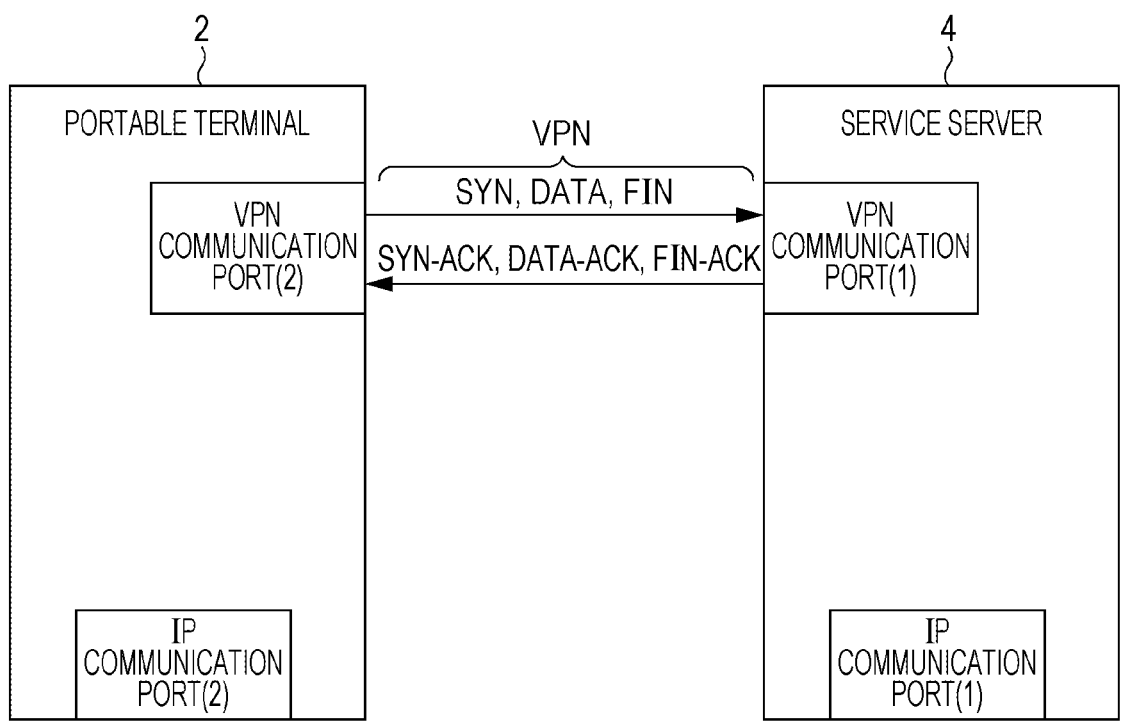
FIG. 4 illustrates a VPN connection.
Figure 8:
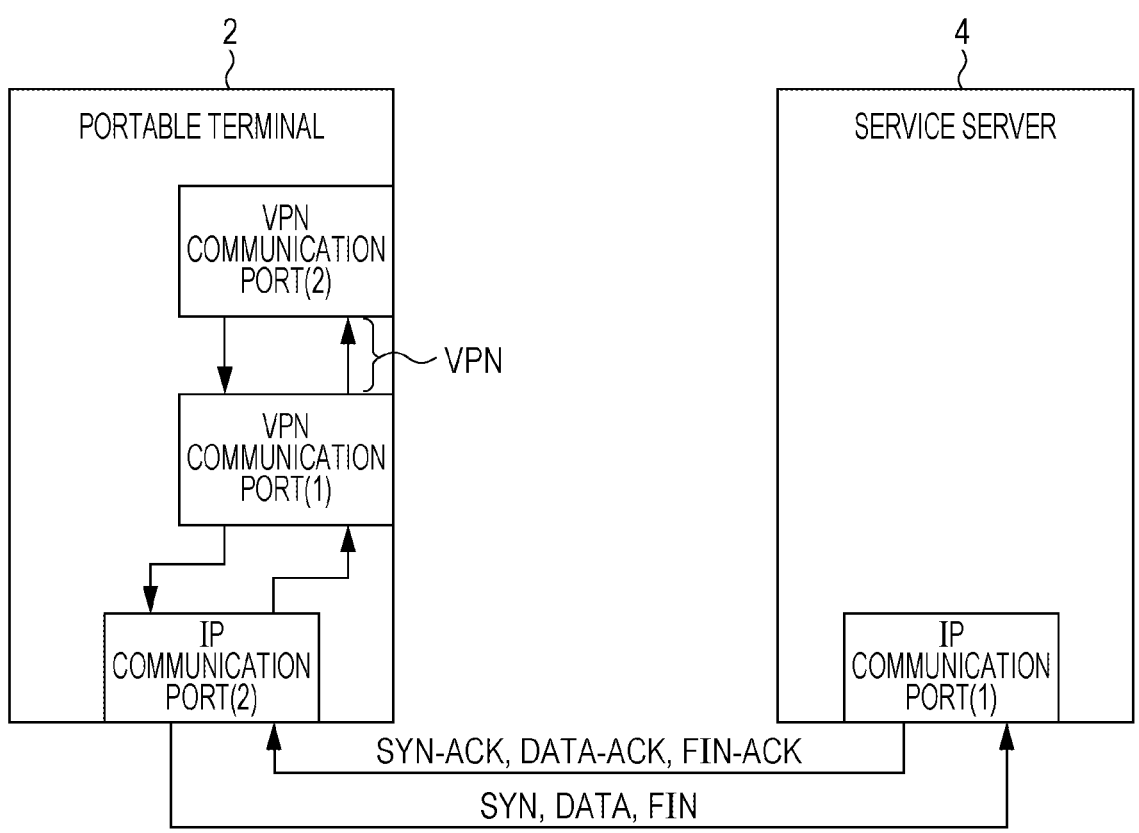
FIG. 8 illustrates another exemplary embodiment of the VPN connection.

In the foregoing description, in addition, the VPN communication port (1) is implemented in the service server 4 (see FIG. 4). However, the VPN communication port (1) may be implemented in the portable terminal 2 instead of the service server 4. That is, both the VPN communication port (1) and the VPN communication port (2) may be implemented in the portable terminal 2 as illustrated in FIG. 8. That is, in this case, the microprocessor implements the VPN communication port (1) and the VPN communication port (2), which communicate with each other via the VPN utilizing the VPN communication function, in the portable terminal 2 in S101. As a result of S101, the VPN is implemented in the portable terminal 2. In this case, the dummy packets SYN, DATA, and FIN transmitted from the VPN communication port (2) to the VPN communication port (1) via the VPN are transmitted from the IP communication port (2) to the IP communication port (1) via the WAN. In addition, the acknowledgement packets SYN-ACK, DATA-ACK, and FIN-ACK are transmitted from the IP communication port (1) to the IP communication port (2) via the WAN, and thereafter transmitted from the IP communication port (1) to the IP communication port (2) via the VPN.

Also in this way, the round trip time RTT is obtained without requiring a root authority. Moreover, it is not necessary to implement the VPN communication port (1) in the service server 4, which enhances the scalability of the service server 4.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A communication status measurement device configured to be connected to a public network and to communicate with a server connected to the public network through a communication channel determined in advance, comprising:
   at least one hardware processor comprising:
      a measurement unit configured to repeatedly measure a time since a dummy packet is transmitted to the server until an acknowledgement packet corresponding to the dummy packet is received;
      a pattern calculation unit configured to calculate a pattern obtained by removing a component occurring at frequencies greater than a first frequency from a pattern of variations in a measured value measured by the measurement unit;
      an RTT acquisition unit configured to acquire a round trip time, which is used to calculate an actual bandwidth of the communication channel, on a basis of the pattern calculated by the pattern calculation unit; and
      an implementation unit configured to implement a virtual private network in the communication status measurement device itself,
   wherein the dummy packet is configured to be transmitted and the acknowledgement packet is configured to be received via the virtual private network and the public network, and
   wherein the component is noise received by the measurement unit while repeatedly measuring the time.

2. The communication status measurement device according to claim 1, wherein the at least one hardware processor further comprises:
   a VPN connection unit configured to connect the communication status measurement device to the server over the virtual private network,
   wherein the dummy packet is further configured to be transmitted and the acknowledgement packet is further configured to be received via the virtual private network.

3. The communication status measurement device according to claim 1, wherein the at least one hardware processor further comprises:
   a calculation unit configured to calculate a pattern obtained by removing a second component occurring at frequencies less than a second frequency, which is a frequency that is equal to or greater than the first frequency, from the pattern of variations in the measured value measured by the measurement unit; and
   a modeling unit configured to model a mode of variations in the noise component contained in the measured value measured by the measurement unit on a basis of the pattern calculated by the calculation unit.

4. The communication status measurement device according to claim 1, wherein the dummy packet is transmitted through the VPN, and
   the time comprises a time since the dummy packet is transmitted, through the VPN, to the server until the acknowledgement packet is received, through the VPN.

5. The communication status measurement device according to claim 1, wherein the pattern calculation unit is further configured to Fourier transform the pattern, of the variations in the measured value, from a time-domain into a frequency-domain, to obtain the pattern, obtained by removing the component, by an inverse-Fourier transformation performed after removing variations occurring at the frequencies greater than the first frequency from a representation of the pattern, of the variations in the measured value, in the frequency-domain.

6. A communication status measurement method using a communication status measurement device that is wirelessly connected to a public network and that communicates with a server connected to the public network through a communication channel determined in advance, the communication status measurement method comprising:
   repeatedly measuring a time since a dummy packet is transmitted to the server until an acknowledgement packet corresponding to the dummy packet is received;
   calculating a pattern obtained by removing a component occurring at frequencies greater than a first frequency from a pattern of variations in a measured value measured in the measuring;
   acquiring a round trip time, which is used to calculate an actual bandwidth of the communication channel, on a basis of the pattern calculated in the calculating; and
   implementing a virtual private network in the communication status measurement device itself,
   wherein the dummy packet is transmitted and the acknowledgement packet is received via the virtual private network and the public network, and wherein the component is noise received by the measurement unit while repeatedly measuring the time.

7. A non-transitory computer readable medium storing a program for causing a computer that is wirelessly connected to a public network and that communicates with a server connected to the public network through a communication channel determined in advance to execute a communication status measurement process, the process comprising:
- repeatedly measuring a time since a dummy packet is transmitted to the server until an acknowledgement packet corresponding to the dummy packet is received;
- calculating a pattern obtained by removing a component occurring at frequencies greater than a first frequency from a pattern of variations in a measured value measured in the measuring;
- acquiring a round trip time, which is used to calculate an actual bandwidth of the communication channel, on a basis of the pattern calculated in the calculating; and
- implementing a virtual private network in the communication status measurement device itself,
- wherein the dummy packet is transmitted and the acknowledgement packet is received via the virtual private network and the public network, and
- wherein the component is noise received by the measurement unit while repeatedly measuring the time.

* * * * *